Patented Aug. 8, 1939

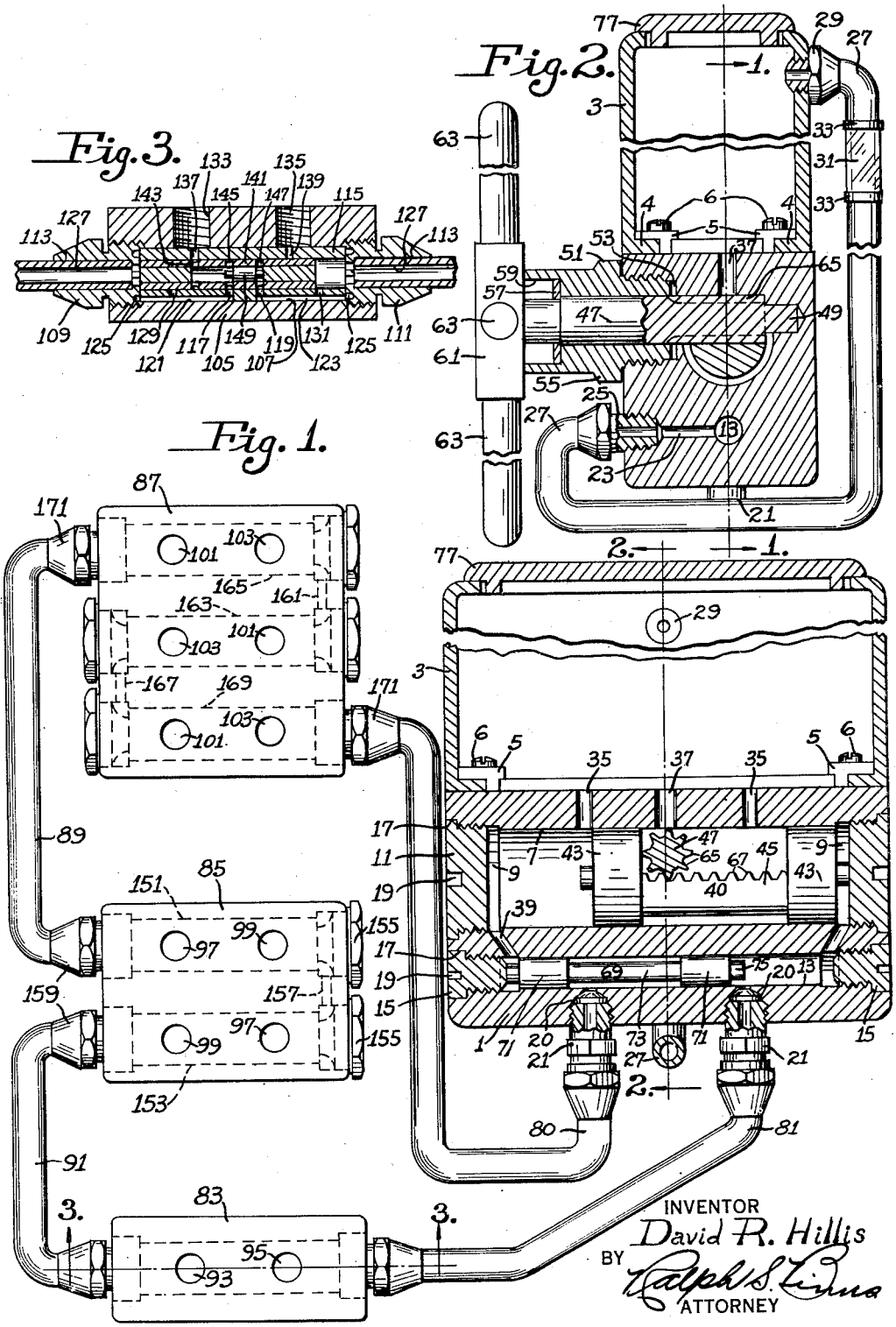

2,168,937

UNITED STATES PATENT OFFICE 2,168,937

UNITARY FLOW REVERSING PUMP AND CONTROL VALVE

David R. Hillis, Detroit, Mich., assignor to Trabon Engineering Corporation, Cleveland, Ohio, a corporation of Ohio Application October 21, 1936, Serial No. 106,853

7 Claims. (Cl. 184—28)

My invention pertains to a fluid circulating device for single-line reverse-flow distributing systems and more particularly to a unitary flow reversing pump and control valve.

It is an object of my invention to provide a pump of simple compact construction which is convenient for installation and mounting with a minimum of external connecting conduits.

It is also an object of my invention to provide a manually operated pump comprising a minimum number of moving parts and including an automatic flow control device integral therewith to provide a compact unit with a minimum of external connections.

It is a further object of my invention to provide a reverse-flow double acting pump comprising a body having a piston guiding aperture extending therethrough, a valve guiding aperture, a fluid storing reservoir upon the feeder body, a fluid flow indicator, a pair of discharge outlets spaced in the body, with fluid transmitting passages interconnecting between the reservoir and the piston guiding aperture and between the ends of the valve and piston guiding apertures, a manually actuatable piston for pumping fluid from said reservoir alternatively into opposite ends of the valve guiding aperture for operating an automatic flow control valve therein to discharge fluid alternatively from said discharge outlets and to receive the fluid which has by-passed through the distributing system and to transmit the same through the fluid indicator into the reservoir on the feeder.

Another object of my invention is to provide a single-line reverse-flow distributing system having in combination a plurality of series connected feeders each comprising a plurality of discharge outlets and a pair of service ports, and fluid actuated means in each feeder responsive to the injection of fluid into one of its service ports for discharging a quantity of fluid from a corresponding one of the discharge outlets and for thereafter by-passing the injected fluid through the other one of its service ports, conduit means connecting between the service ports of said feeders for connecting them in series relation in the system and a manually actuatable fluid pumping device for pumping fluid alternately into opposite ends of said line whereby each feeder discharges a predetermined quantity of fluid in succession and by-passed fluid is passed through a fluid flow reversing device in the pump for connecting the by-passed fluid into a fluid storing reservoir through a fluid flow indicator whereby the operator is informed of the completed operation of the system and the by-passed fluid is conserved for future use.

The invention itself, however, both as to its construction and its method of operation in conjunction with a system, together with additional objects and advantages thereof, will best be understood from the following description of a specific embodiment when read in conjunction with the accompanying drawing wherein like reference characters designate similar parts throughout and, in which:

Fig. 1 is a longitudinal sectional view on line 1—1 of Fig. 2 showing one of my fluid circulating devices connected with a single-line reverse-flow distributing system;

Fig. 2 is a sectional view of my fluid circulating device taken on lines 2—2 of Fig. 1; and Fig. 3 is a sectional view taken on line 3—3 of Fig. 1 and showing one of the fluid distributing feeders used in the single line reverse flow distributing system.

Referring more specifically to the drawing, my reverse-flow fluid circulating device comprises a feeder body 1 which has a fluid receiving and storing reservoir 3 on the upper portion thereof. The side walls of the reservoir 3 are provided around their lower edges with an inturned flange 4 for receiving a collar 5 through which screws 6 extend into the feeder body 1 for clamping the reservoir thereon. A gasket or any suitable yielding material may be provided for sealing between the reservoir and the body as will be understood.

The feeder body has a piston guiding aperture 7 which extends therethrough and which is provided with enlarged counter-bores 9 at opposite ends thereof and which are internally threaded for receiving closure plugs 11. The feeder body is also provided with a valve guiding aperture 13 which extends through the body in substantially parallel relation to the piston guiding aperture 7. The opposite ends of the valve guiding aperture 13 are internally threaded for receiving plugs 15. The closure plugs 11 and 15 which close the ends of the piston and the valve guiding apertures are preferably provided with a wide lateral flange 17 which is adapted to seat in an annular groove provided around the outer edge of the apertures for accurately limiting the position of the plug in the body. The plugs are of such a thickness that their outer surfaces seat flush with the outer surfaces of the body, and a suitable tool receiving aperture 19 is provided whereby a tool, such as a screw driver, may be conveniently applied for inserting or removing the plug.

The feeder body 1 is provided with a pair of spaced discharge outlets 20 which connect into the side of the valve guiding aperture in intermediate spaced positions. The discharge outlets are threaded to receive suitable pipe fittings 21 whereby they are adapted to be connected to the opposite ends of a single-line fluid distributing system. From the middle of the valve guiding aperture 13, a fluid conducting passageway 23 extends through the side of the feeder body where, at its outer end, it is provided with an enlarged counter-bore which is internally threaded for receiving a pipe fitting 25 by which it is connected permanently to one end of a by-pass fluid receiving conduit 27. The other end of the by-pass fluid receiving conduit 27 is connected into the upper portion of the fluid receiving reservoir 3 through an aperture therein provided with a suitable pipe fitting 29 by which the upper end of the conduit is firmly secured.

The by-pass fluid receiving conduit 27 is provided with fluid flow indicating means 31 for indicating the flow of fluid therethrough. As shown, the indicator 31 comprises a glass tube inserted therein. For securing the glass tube in sealed relation between separated ends of the fluid by-passing conduit 27 the adjacent ends of the conduit are provided with clamping rings 33 which are threadably received thereon for compressing any suitable packing gasket (not shown) tightly sealing the tube in a manner quite similar to the usual arrangement of water gage glasses on steam boilers, as will be readily understood.

The piston guiding aperture 7 in the feeder body is provided with inlet ports 35 which extend from intermediate spaced points upwardly through the bottom of the fluid storing reservoir 3 which is mounted on top of the feeder body. From the middle of the piston guiding aperture, a fluid conducting passage 37 also extends upwardly through the bottom of the reservoir. Between the adjacent ends of the piston and the valve guiding apertures 7 and 13 respectively, fluid conducting passageways 39 and 41 extend for passing the discharged fluid into either adjacent end of the valve guiding aperture.

For drawing the fluid from the reservoir and forcefully expelling it from the discharge outlets 20 alternatively, I provide a piston 40 slidably disposed in the aperture 7 and comprising two piston heads 43 and a reduced interconnecting member 45 secured therebetween in offset relation. The dimensions of the piston heads 43 and their spaced relation in the piston guiding aperture 7, is so related to the spacing of the inlet ports connecting from the reservoir, that the piston in reciprocating from one end of the aperture to the other, places its intermediately positioned head 43 between the adjacent fluid inlet 35 and the middle aperture 37.

For actuating the piston 40 to pump the fluid forcefully from the reservoir 3 into opposite ends of the valve guiding aperture 13, a shaft 47 extends transversely into the feeder body and is provided with a reduced bearing fitting portion 49 at its innermost end where it is journalled in a suitable bearing aperture provided in the side of the body. The actuating shaft 47 projects from the opposite side wall of the feeder body through a bearing plug 51 which is externally threaded at one end whereby it is secured into an internally threaded counter-bore 53. The bearing plug 51 is provided with a laterally projecting shoulder 55 which abuts the outer surface of the body to limit the position of the plug therein.

At its outer end, the actuating shaft 47 is turned down to a smaller diameter to receive a retaining disk 57 which fits snugly thereon and is pressed tightly into an enlarged counter-bore 59 provided in the outer end of the bearing plug 51. The retaining disk 57 may be firmly secured in the bottom of the counter-bore 59 by welding or in any suitable manner as by pressing it tightly therein, and by engagement with the outwardly turned shoulder thus provided on the actuating shaft 47, it retains the latter firmly in seated position with its small inner end 49 firmly journalled in the body. For manually actuating the shaft 47, the outer end thereof is provided with a hub 61 which supports radially projecting spokes 63 or other convenient means such as a hand wheel whereby an operator is enabled to conveniently oscillate the shaft.

For actuating the reciprocatable piston 40 in its guiding aperture 7 in accordance with the oscillations of the manually actuated shaft 47, gear teeth 65 are cut around the outer peripheral surface of the shaft, as shown in Fig. 1, and these inter-mesh with gear teeth 67 provided on the upper surface of the interconnecting member 45 between the piston heads 43.

The connection from either one of the discharge outlets 20 in the body is automatically controlled to transmit by-passed fluid returning from the connected end of the service line to pass through the fluid receiving conduit 27 and the fluid flow indicator 31 to the reservoir 3 on the feeder body. For this purpose, I provide a dumb-bell valve 69 which is slidably disposed in the valve guiding aperture 13. The valve piston 69 comprises a pair of valve heads 71 which are joined through an interconnecting member 73 of reduced cross-section to provide a fluid passing therebetween. The valve piston heads 71 are of suitable size and so spaced by the connecting member, that as the piston is reciprocated from one end to the other of the valve guiding aperture, it serves to connect the middle discharge port 23 directly with the respective discharge outlet 20 of the body which connects from the end of the valve guiding aperture to which the piston has moved. This connection is established through the fluid conducting space around the connecting member 73 of reduced cross-section between the valve heads.

A spacing member 75 of reduced cross-section extends axially from the outer end of each valve head 71 and is of suitable length for abutting the closure plugs 15 to limit the movement of the adjacent valve head whereby it cannot completely cut off the fluid flow from the outer ends of the associated conduit passage 39 and 41.

My fluid circulating device is connected into a single-line reverse-flow distributing system by attaching the line conduits 80 and 81 respectively to the discharge outlet fixtures 21 which are mounted in their respective discharge outlets of the body of the pumping device. For distributing predetermined quantities of the fluid to bearings, or other receiving stations, located adjacent the circuit of the distributing system, I provide fluid distributing feeders 83, 85 and 87 which are connected in series relation between the conduits 80 and 81 extending from the fluid circulating pump.

Each of the feeder bodies comprises a pair of service ports and interconnecting conduits 89 and 91 are provided whereby all the feeders are disposed in series relation. As shown, the smallest feeder 83 is provided with two discharge ports 93 and 95, the medium feeder 85 is provided with four discharge ports comprising two sets 97 and 99 and the largest feeder 87 is provided with six discharge ports comprising two sets 101 and 103. Each feeder is provided with fluid actuated means disposed within its body which in response to the injection of fluid into either one of its service ports discharges a predetermined quantity of fluid from one set comprising half of its discharge outlets, the remaining discharge outlets delivering a charge of fluid when the fluid is injected through the feeder in the opposite direction.

For this purpose, I have provided an unusually simple mechanism which is positive acting and requires a minimum of moving parts. Such a device is clearly shown in Fig. 3 which is a sectional view taken longitudinally through one of the feeders shown in the distributing system in Fig. 1, and is also fully disclosed in my co-pending patent application, Serial No. 106,362 filed concurrently herewith.

As shown in Fig. 3, such a device comprises a body 105 having an aperture 107 extending longitudinally therethrough. An enlarged counterbore is provided in each end of the aperture and these are internally threaded for receiving service-port members 109 and 111 which comprise pipe fittings for connecting the feeder into the system.

Each of the end fixtures is provided with an extended portion of suitable conformation for receiving a wrench or other tool and having a service duct 113 which extends axially therethrough.

A tubular guiding sleeve 115 is provided in the aperture 107 preferably of such a length that its ends are firmly engaged by the innermost ends of the service port plugs 109 and 111 for securing it in its proper position in the body. A pair of intermediate ports 117 and 119 penetrate the side walls of the guiding sleeve 115 at axially spaced positions near the middle of the sleeve, and conductive connections are provided from each of said ports to the adjacent end of the sleeve by respective grooves 121 and 123 extending therefrom and cut axially along the outer peripheral surfaces of the sleeve in any convenient manner. Conductive association is established through a fluid conducting groove 125 of annular conformation which is cut into the inner ends of the service port plugs 109 and 111. From the annular groove 125 in the end of each plug, conductive connection is established through ports 127 which extend inwardly into the main service duct 113. Ports 129 and 131 are provided which connect into the respective grooves 121 and 123 at spaced positions in the side walls of the guiding sleeve between the intermediate ports 117, 119 and the ends. The top wall of the body 105 is provided with two axially spaced discharge outlets 133 and 135, which are connected into the guide sleeve through respective discharge ports 137 and 139 in the top walls thereof.

For controlling the flow of fluid between the service ports 109 and 111 and the discharge outlets 133 and 135 in the body, I provide fluid pressure responsive means slidably disposed within the guide sleeve which comprises a hollow piston 141. Extending through the side walls of the hollow piston 141 are three axially spaced ports 143, 145 and 147 which are adapted for conductive connection by pairs with the middle sleeve ports 117 and 119, as the piston slides between its two extreme positions in the aperture. Also the two remotely spaced piston ports 143 and 147 are adapted for connection selectively with one or the other of the discharge ports 139 or 137. The piston is also provided with three external grooves cut circumferentially around and connecting from each one of the axially spaced ports 143, 145 and 147.

The piston, as it slides back and forth between two positions in the body, is thus connected between either service port and the remote discharge outlet in the body. The middle piston port 145 comprises a by-pass port and it connects selectively with one or the other of the middle sleeve ports 117 or 119.

To control the connections through the hollow piston and for discharging the fluid therefrom, I provide an auxiliary piston 149 which is slidably disposed therein. The axial dimension of the auxiliary piston 149 is so selected that it is less than the distance between adjacent pairs of the spaced ports in the hollow piston, and it is provided on opposite ends with axially projecting stop members.

In operation, assuming that fluid is injected into the service port plug 111 in the right hand end of the feeder body, it tends to push the hollow piston 141 to the left hand end of the piston guiding aperture in the guide sleeve, as shown in Fig. 3. As the piston moves to this position, it establishes conductive connection between the left hand discharge port 137 in the guide sleeve and the end port 143 in the hollow piston while also establishing conductive connection between the right hand port 147 in the hollow piston and the right hand intermediate port 119 in the guide sleeve.

Having thus established the operative connections, the injected fluid passes through the service duct 111 thence passes through ports 127 into the annular groove 125, thence into and through the groove 123 and thence through the right hand one 119 of the middle ports in the sleeve and thus into the right hand end of the hollow piston by way of the piston port 147. As the fluid enters the right hand end of the hollow piston, it drives the auxiliary piston 149 towards the left, thus discharging fluid therefrom into the discharge port 137 and out the discharge outlet 133 of the body.

As the auxiliary piston 149 completes its stroke, it opens a connection through the middle or by-pass port 145 of the hollow piston which is connected with the left hand middle port 117 in the guide sleeve. The injected fluid is now by-passed freely through the feeder passing through the axial groove 121 in the sleeve and into the annular groove 125 in the end of the left hand service port plug 109 thence out of the service duct 113 extending therethrough. The fluid then by-passes freely through the feeder to the next fluid distributing feeder or to the source.

When the flow of fluid is reversed, it enters at the left hand service port plug 109 and pushes the slidable hollow piston to the right hand end of its guide sleeve where it engages the adjacent end of the service plug which serves to limit its movement.

In this position, the connections are reversed and the fluid enters the left hand end of the hollow piston and moves the auxiliary piston 141 to the right thereby discharging the fluid, which was charged therein during the previous operation, through the discharge port 139 and the discharge outlet 135 of the body. After thus discharging a measured quantity of the fluid, the auxiliary piston again opens the by-passing port 145 in the hollow piston and the injected fluid is thereafter freely by-passed in the opposite direction. Thus the injection of fluid, alternatively into the service ports of the feeder, causes the discharge of a measured quantity of fluid from corresponding ones of the discharge outlets and the free by-passing of the fluid thereafter.

The medium sized feeder 85 comprising four discharge outlets in its body consists substantially of two of the above devices provided in a single body. For this purpose, the body which is larger is provided with two apertures 151 and 153 extending longitudinally therethrough in spaced parallel relation. The right hand ends of these apertures are closed by suitable plugs 155 which are screwed therein and which are suitably tapered to provide passages for conducting the fluid around the inwardly directed ends for transmitting fluid by-passed through either one of these feeder devices to the other feeder device through a transverse conduit 157 which extends through the body between the adjacent right hand ends of the apertures. At their left hand ends, both apertures are provided with suitable pipe fittings 159 for connecting with the line conduits 89 and 91.

When fluid is injected into either one of the service port pipe fittings, the adjacent fluid responsive mechanism is operated to discharge a predetermined quantity of the fluid from one of its associated discharge ports and to thereafter bypass the fluid through the transverse conduit 157 in the body to the right hand end of the other aperture. The other fluid responsive mechanism is then actuated to discharge a predetermined quantity of fluid from one of its associated discharge ports and to thereafter by-pass the fluid to the other service port pipe fitting from which it continues to the distributing line.

In this manner, fluid is discharged from half of the discharge ports in the body by the injection of fluid therethrough in a predetermined direction. When fluid is injected through the line in reverse direction, it causes it to enter and pass through the feeder body in the reverse direction thereby successively discharging fluid from the remainder of the discharge ports, as will be readily understood.

The arrangement shown in the large feeder 87 connected into the distributing system is quite similar except that the large body includes three fluid actuated mechanisms connected in series relation. For this purpose, fluid connecting ducts extend transversely from opposite ends of the central aperture in the body. One of these ducts 161 extends upwardly from the right hand end of the middle aperture 163 to the adjacent aperture 165 and the other duct 167 extends downwardly from the left hand end into the adjacent end of the lower aperture 169. The right hand end of the lower aperture is provided with suitable pipe fitting 171 for connecting the service port with the distributing system and the left hand end of the aperture is similarly equipped.

In operation, the fluid receiving reservoir 3 is filled with a suitable lubricant, or other fluid which is to be distributed by the system, and the reservoir is preferably closed thereafter by placing a cover 77 thereon. By turning the hand wheel 63, the operator oscillates the actuating shaft 47 thereby reciprocating the double headed piston 40 in the piston guiding aperture 7. Assuming that the piston, as shown in Fig. 1, has just completed a stroke to the right hand end of its aperture, the piston head 43 which is in the intermediate portion of the aperture has just uncovered the left hand inlet port 35 connecting from the reservoir. As this occurs, the partial vacuum created in the evacuated end of the aperture 7 sucks in a charge of fluid from the reservoir.

As the operator now oscillates the shaft 47 in the opposite direction, the piston 40 is driven toward the left hand end of its aperture and forcefully expels therefrom the charge of fluid received from the reservoir. The charge of fluid passes from the piston guiding aperture through the fluid conducting passage 39 into the adjacent end of the valve guiding aperture 13. As the fluid enters the valve guiding aperture 13 around the spacing member 75 projecting from the valve head 71, the pressure therein built up pushes the double headed valve piston 69 to the right hand end of its aperture. In this position, the left hand valve head 71 will have passed beyond the adjacent discharge outlet 20 in the body, it will be disposed between it and the discharge port 23 which connects from the middle of the aperture.

A free connection is now provided for passing the fluid discharged from the piston guiding aperture through the connected discharge outlet 20 into the associated end of the distributing system. As the fluid passes completely around the distributing system, a portion thereof passes through the other end of the distributing system and enters the other, or right hand, discharge outlet 20 of the body. Since the right hand valve head is now disposed to the right hand side of this connection, the flow of the by-passed fluid in this direction is obstructed, and a free passage is provided for the by-passed fluid around the reduced interconnecting member 69 of the valve and out of the discharge port 23 connecting from the middle of the valve guiding aperture.

The by-passed fluid is thus conducted into the fluid receiving conduit 27 and passing through the fluid flow indicator 31 indicates to the operator that the fluid distributing operation is completed. The by-passed fluid thence passes upwardly into the upper portion of the fluid receiving reservoir 3 and is stored for future use.

As the manually actuated shaft 47 is actuated in the opposite direction thus driving the piston 40 in the opposite direction, the fluid which was previously charged into the right hand end of the piston guiding aperture, is forcefully expelled therefrom thus forcing the valve piston 69, of the automatic flow reversing device, to the left hand end of its aperture, to the position shown in Fig. 1. In this position, the fluid discharged from the piston guiding aperture 7 is transmitted freely into the other end of the distributing system. When the distribution of fluid around the system is then completed, the by-passed fluid passes through the other end of the system into the associated discharge outlet 20 of the body, thence around the reduced valve connecting member 73 and it continues through the discharge port 23 into the valve receiving conduit and appears in the fluid flow indicator. This indication informs the operator that the fluid distribution has been successfully completed in the opposite direction.

Aside from the specific embodiments of the invention, as already described and shown, it will be understood that numerous details of the construction and arrangement may be altered or omitted without departing from the spirit and scope of my invention, and that I do not desire to be limited to the exact arrangements herein set forth.

I claim:

1. A fluid circulating device for single-line reverse-flow distributing systems having in combination, a body, two discharge outlets in said body adapted to be connected to opposite ends of a single line distributing system, a fluid reservoir thereon, a fluid flow indicator, a fluid receiving conduit for passing fluid into said reservoir through said fluid flow indicator, a double acting pump in said body for discharging fluid from said reservoir through respective ones of said discharge outlets alternately and fluid actuated means in said body responsive to the discharged fluid for connecting the other discharge outlet for transmitting the by-passed fluid returning from the other end of the line through said fluid flow indicator into the reservoir.

2. A fluid circulating device for single-line reverse-flow distributing systems having in combination, a body, two discharge outlets in said body adapted for connection to opposite ends of a single line distributing system, a fluid reservoir thereon, a fluid flow indicator, a fluid receiving conduit for passing fluid into said reservoir through said fluid flow indicator, a piston slidably disposed in said body for discharging fluid from said reservoir through said discharge outlets alternately, manually actuable means for actuating said piston to discharge fluid alternately from the discharge outlets and fluid actuated means in said body responsive to the fluid discharged by said piston for passing the fluid through a corresponding discharge outlet and for simultaneously connecting the other discharge outlet for transmitting the fluid by-passed from said system through said fluid flow indicator into the reservoir.

3. A fluid circulating device for single-line reverse-flow distributing systems having in combination, a body, a fluid reservoir thereon, a fluid flow indicator, a fluid receiving conduit for passing fluid into said reservoir through said fluid flow indicator, a piston guiding aperture extending through said body, a piston slidably disposed in said aperture, manually actuatable means for reciprocating said piston, a pair of discharge outlets in said body, conduit means in said body for connecting said discharge outlets to receive fluid discharged from opposite ends of said piston guiding aperture, a valve means in said body, actuatable by fluid in said conduit means for alternatively connecting the discharging end of the piston guiding aperture into a corresponding one of said discharge outlets while connecting the other discharge outlet into said fluid receiving conduit for transmitting the fluid by-passed through the system, through said fluid flow indicator into the reservoir.

4. A fluid circulating device for single-line reverse-flow distributing systems having in combination, a body, a reservoir, a fluid flow indicator, a fluid receiving conduit for passing fluid into said reservoir through said fluid flow indicator, two discharge outlets in said body, a piston guiding aperture extending through said body, conduit means in said body connecting from the opposite ends of said piston guiding aperture into said discharge outlets, inlet ports connecting from intermediate spaced points in the side walls of said piston guiding aperture for admitting fluid from said reservoir, a piston slidably disposed in said aperture, including two heads and a reduced connecting member, manually actuatable means operatively engaging said connecting member for reciprocating said piston in said aperture and an automatic flow reversing device in said body responsive to the fluid discharged from opposite ends of said aperture for passing the discharged fluid through a corresponding one of said discharge outlets and for connecting the other discharge outlet to transmit by-passed fluid returning from the line into the reservoir through said fluid receiving conduit and said flow indicator.

5. A fluid circulating device for single-line reverse-flow distributing systems having in combination, a body, a reservoir, a fluid receiving conduit for passing fluid into said reservoir, discharge outlets in said body, a piston guiding aperture in said body, conduit means in said body connecting from the opposite ends of said piston guiding aperture through said discharge outlets, inlet ports connecting from the reservoir into the piston guiding aperture, a piston slidably disposed in said aperture including two heads and an off-set connecting member of reduced cross-section secured therebetween, an actuating shaft journalled in said body and disposed transversely through said piston guiding aperture adjacent said connecting member, gear teeth on the adjacent side of said connecting member, and gear teeth in said shaft for operatively inter-meshing with the gear teeth on said connecting member.

6. A fluid circulating device for single-line reverse-flow distributing systems having in combination, a body, a reservoir, a piston guiding aperture extending through said body, a piston slidably disposed in said aperture, a valve guiding aperture extending through the body, an inlet port connecting from each end of said aperture to receive fluid from a corresponding end of the piston guiding aperture, two discharge outlets in said body connecting from spaced intermediate positions along said valve guiding aperture, a discharge port connecting from the middle of said valve guiding aperture, conduit means connecting from said discharge port to said reservoir, valve means slidably disposed in said aperture and actuable by the injection of fluid into either end thereof to establish connections for conducting the injected fluid to the adjacent one of the discharge outlets while simultaneously connecting the other discharge outlet to said discharge port, for returning by-passed fluid to the reservoir, and means for reciprocating said piston.

7. A fluid circulating device for single-line reverse-flow distributing systems having in combination, a body, a fluid flow indicator, a piston guiding aperture extending through said body, a valve guiding aperture extending through said body, inlet ports connecting from said reservoir into intermediate points in said piston guiding aperture, fluid conducting passages connecting from the ends of said piston guiding aperture to adjacent ends of said valve guiding aperture, discharge outlets connecting from spaced intermediate points along said valve guiding aperture, a discharge port connecting from the middle of said valve guiding aperture, a fluid receiving conduit connecting from said discharge port for passing fluid into said reservoir through said fluid flow indicator, an automatic flow reversing valve in said valve guiding aperture, and manually actuatable means for reciprocating said piston in its guiding aperture for discharging fluid alternately from said discharge outlets and actuating said automatic flow reversing valve to transmit the by-passed fluid alternatively received from the opposite discharge outlet through said discharge port for returning it to the reservoir through said fluid flow indicator.

DAVID R. HILLIS.